July 3, 1962

H. O. SCHJOLIN 3,041,892

TRANSMISSION

Filed April 25, 1956

INVENTOR
Hans O. Schjolin
BY
T. L. Chisholm
ATTORNEY

INVENTOR.
Hans O. Schjolin
ATTORNEY 3,041,892
TRANSMISSION
Hans O. Schjolin, Birmingham, Mich., assignor to General Motors Corporation, Detroit, Mich., a corporation of Delaware
Filed Apr. 25, 1956, Ser. No. 580,628
15 Claims. (Cl. 74—732)

This invention relates to improvements in transmissions and particularly to a two-speed transmission especially suited for separate or combined usage with multi-speed gearing.

In transmissions that are required to transmit large torques at many different speeds, as in heavy duty trucks, it is desirable to have a transmission with several available speed ratios suitable for various operating conditions that transmits drive between the engine and the wheels smoothly and efficiently. Such a transmission must be practical, as well as compact and capable of versatile operations under many extreme conditions.

The present invention seeks as one of the objects to provide a compact efficient two-speed transmission that is readily combinable with a conventional multi-speed transmission, that is suitable for many applications and that employs a simplified control system.

A related object is to provide a transmission employing a hydrodynamic drive device which can be selectively made operative when smoothness is desired or can be locked up by clutch means closely associated with the device when a positive drive is preferred, either for efficiency or for initiating a power start of the vehicle as when mired in mud.

Another object of the invention is to provide brake means including controls for simultaneously interrupting the drive connection through the two-speed transmission and retarding the rotational tendency of the coacting members, hence facilitating gear shifting of a related conventional multispeed transmission.

More specifically, the invention contemplates the combining of an appropriate two-speed planetary gearing including drive interrupting means with a fluid drive device having integral clutch surfaces constituting a lockup clutch disengageable by pressure within the drive device and engageable either manually or by speed responsive means, the arrangement being especially suited for compacting axially.

The foregoing and other objects and advantages will be more apparent from the following description and from the accompanying drawings in which.

Figure 1:
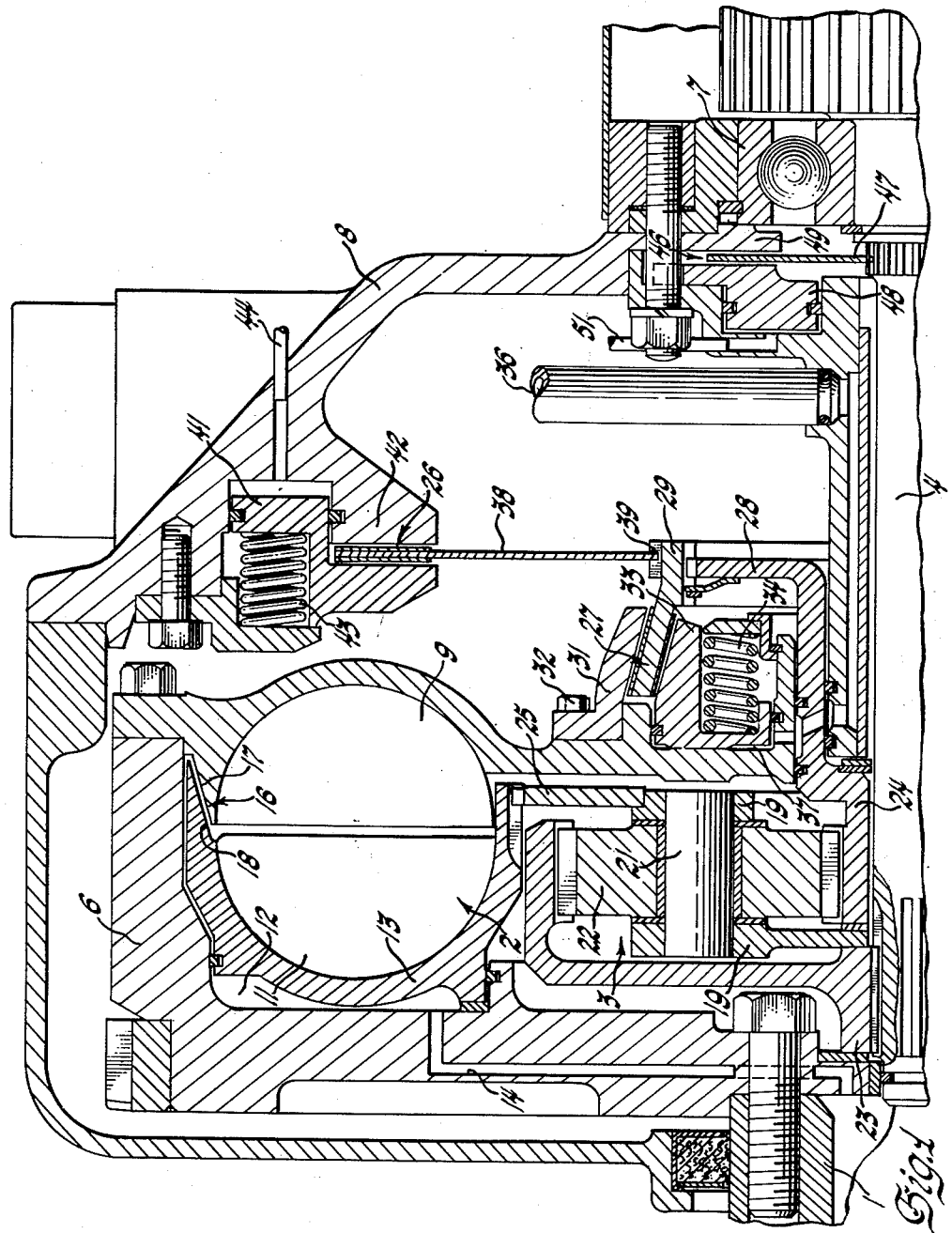
FIGURE 1 is a sectional view of the two-speed transmission.

In an embodiment of the invention shown in FIGURE 1, a driving shaft 1 transmits torque to a hydrodynamic drive device or fluid coupling 2 and then through planetary gearing 3 to a driven shaft 4. The driven shaft 4, piloted at one end by a housing 6 and rotatably supported at the other end by an anti-friction bearing 7 retained by a case 8, drives a conventional sliding gear transmission (not shown).

The housing 6 provides a driving connection between the driving shaft 1 and a fluid coupling impeller or pump 9 and also provides an enclosure for a fluid coupling turbine 11. This enclosure is recessed to provide a cylinder 12 for receiving a piston 13, formed integral with turbine 11. A fluid passage 14 supplies pressure fluid for moving the piston 13 axially from the position illustrated.

To prevent relative motion between the turbine 11 and the pump 9 a lockup clutch 16, comprising a tapered external surface 17 on the pump 9 and a mating internal surface 18 on the turbine 11, functions, whenever pressure fluid in the passage 14 moves the turbine 11 axially, to engage the surfaces 17 and 18. Pressure within the coupling 2 will disengage this clutch 16 when the supply of pressure fluid in the passage 14 is relieved or cut off.

The planetary gearing 3 includes a planet carrier 19 having a plurality of stub shafts 21 for rotatably mounting thereon a plurality of planet pinions 22 that mesh with a ring gear 23 spline connected to the driven shaft 4 and a sun gear 24. A flange 25 attached to the carrier 19 has a spline connection with the turbine 11 which connection transmits drive between the turbine 11 and the carrier 19 and permits axial movement of the turbine 11.

The sun gear 24 is adapted either to be held stationary by a reaction brake 26 or to be connected to the pump 9 by a direct drive clutch 27. To provide the connection with direct clutch 27, a flange 28 integral with the sun gear 24 is connected through a spline to a double faced cone member 29 which coacts with a mating internal surface on an internal cone member 31 affixed at 32 to the pump 9 and a mating external surface on a clutch apply piston 33. A plurality of suitably mounted clutch release springs 34 maintain the piston 33 in the disengaged position depicted until a predetermined fluid pressure, supplied by the conduit 36 to a clutch apply chamber 37, is developed sufficient to overcome these spring forces. When this force is great enough, the piston 33 will move the mating surfaces into engagement, thus clutching the sun gear 24 and the pump 9 together. This engaged clutch 27 will tend to cause the driven shaft 4 to rotate with respect to the driving shaft 1 at a substantially 1 to 1 ratio subject to the slip between the pump 9 and the turbine 11. Since the sun gear 24 will be rotating at the speed of the driving shaft 1 while the ring gear 23 is rotating at some speed less than that of shaft 1, this ratio will not be exactly 1 to 1. The speed of the ring gear 23 and consequently, the speed of the driven shaft 4 will be determined by coupling slip, which is the difference between the speeds of the pump 9 and turbine 11. If the lockup clutch 16 is engaged, then the slip is eliminated and the planetary gearing 3 will rotate as a unit.

The reaction brake 26 includes a friction plate 38 splined at 39 to the double faced cone member 29, a brake piston 41 for holding the friction plate 38 against a fixed surface 42 integral with the case 8, and a plurality of brake apply springs 43 mounted to bias the brake piston 41 to the engaged position. To disengage the brake 26, fluid pressure is supplied through a conduit 44 to act on the face of the piston 41 overcoming the biasing force of the springs 43. It should be noted that, before the sun gear 24 can be restrained from rotation by the engaged brake 26, the direct clutch 27 must be disengaged. With the sun gear 24 held, the ring gear 23 will tend to overspeed relative to the input speed of the carrier 19 thereby providing an overdrive speed ratio.

For retarding the driven shaft 4 or holding it stationary, if the vehicle is stopped, a synchronizing brake 46, including a driven shaft connected friction plate 47 disposed between an apply piston 48 and a coacting stationary surface 49 integral with the case 8, is provided, hence permitting the sliding gears in the transmission to be moved freely to different speed ratio positions. This is desirable since even though the drive connection from shaft 1 is interrupted, the inertia from the rotating parts would otherwise interfere with the proper shifting of gears. Fluid pressure for applying this brake 46 is supplied through a fluid passage 51 by controls to be described which, with the brake 46 engaged, will insure that the lockup clutch 16, the direct drive clutch 27 and the reaction brake 26 are all disengaged to interrupt the drive connection between the driving shaft 1 and the driven shaft 4.

Figure 2:
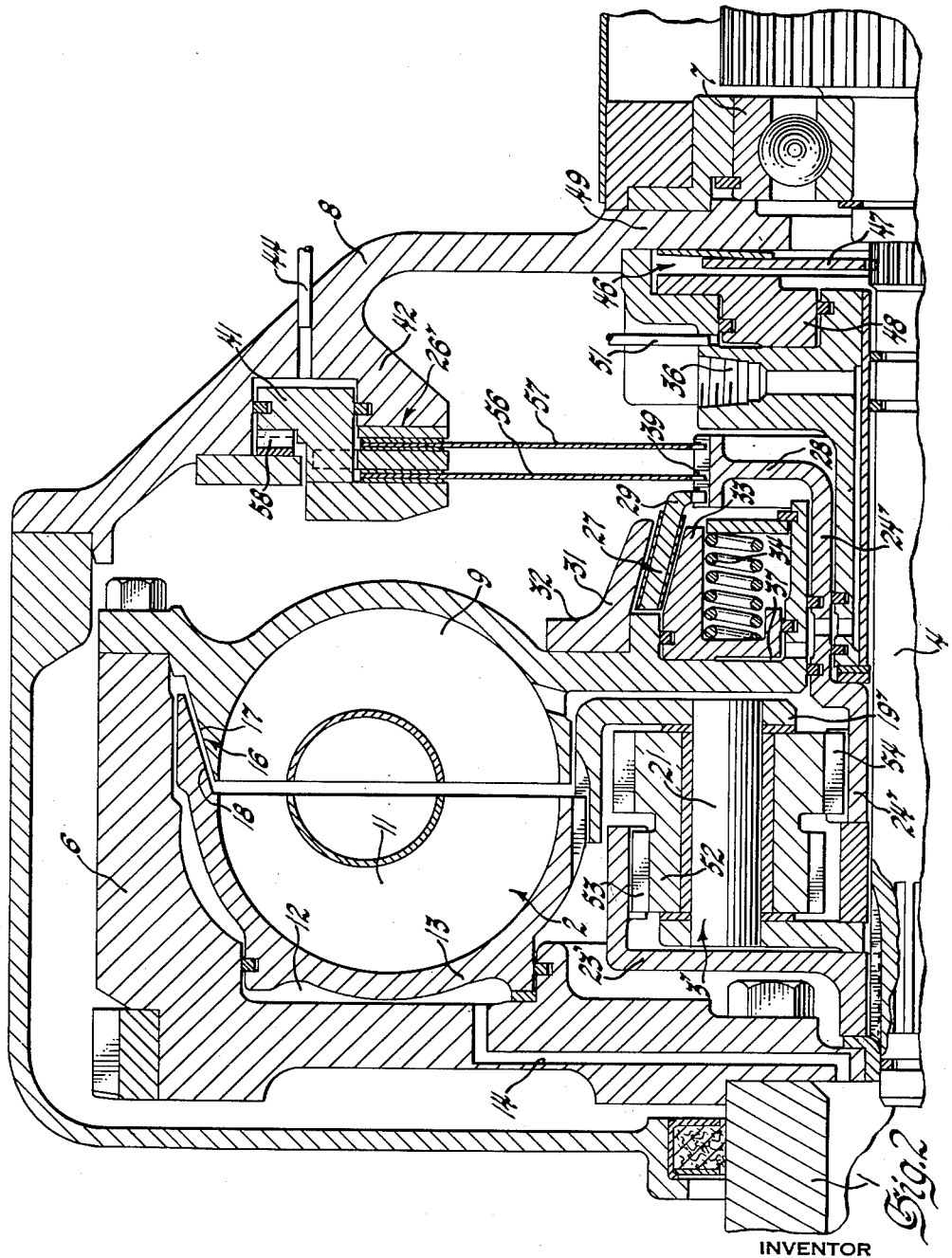
FIGURE 2 is a sectional view of a modified two-speed transmission.

In the FIGURE 2 modification the parts and their relationship are similar to those in FIGURE 1 with the exception of the planetary gearing and the reaction brake. To accommodate a smaller fluid coupling and accordingly, create a more compact unit, planetary gearing 3′ is employed having a plurality of double planet pinions 52 rotatably mounted on a planet carrier 19′ spline connected to the turbine 12. Pinion teeth 53 mesh with mating teeth on a ring gear 23′ and pinion teeth 54 mesh with mating teeth on a sun gear 24′ that, when the sun gear 24′ is held against rotation, the ring gear 23′ will be driven faster than the carrier 19′ resulting in an overdrive speed ratio as in the FIGURE 1 gearing. The other change is structural and relates to a different reaction brake 26′ having two friction plates 56 and 57 replacing the single plate 38 in FIGURE 1 and a wave spring 58 in place of the FIGURE 1 apply springs 43.

Controls

Figure 3:
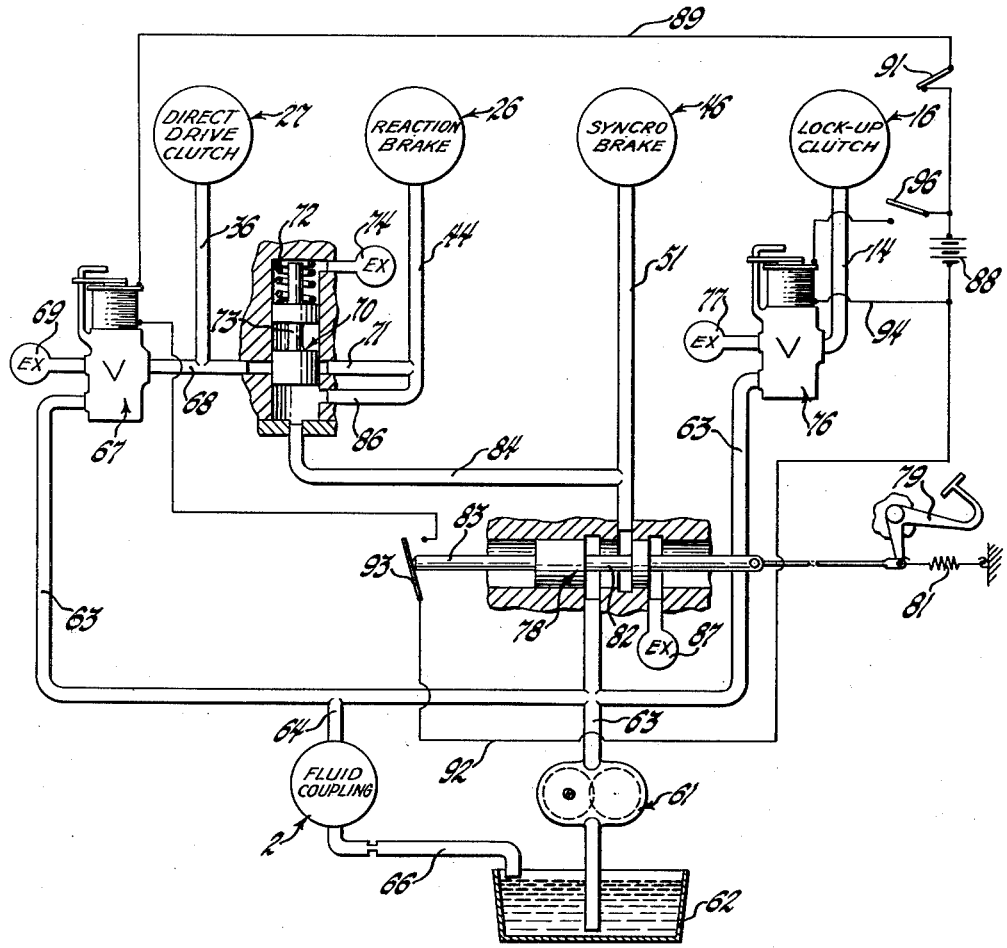
FIGURE 3 is a schematic control diagram of the transmission control system.

In FIGURE 3 a control system for the transmission is illustrated diagrammatically having a pressure fluid source, e.g., a pump 61, preferably engine driven. This pump 61 supplies fluid at a predetermined pressure from a sump 62 to a pressure conduit 63 and then through control valving to the pistons which operate either to engage or disengage clutches 16 and 27 and brakes 26 and 46.

The fluid coupling 2 receives pressure fluid from a passage 64, connected to conduit 63, and then discharges to a sump connected passage 66.

For controlling pressure fluid application of the direct driven clutch 27, a direct drive clutch valve 67 is disposed between conduit 63 and an outlet conduit 68. The valve 67 is preferably solenoid operated in a well-known manner either to permit, when energized, passage of pressure fluid from conduit 63 to outlet conduit 68 or, when de-energized, to close conduit 63 and open outlet conduit 68 to an exhaust passage 69 which exhaust fluid back to the sump 62. When communication between conduits 63 and 68 is established, pressure fluid is supplied through the conduit 36 for engaging the direct drive clutch 27. The structural arrangement of the solenoid operated valve 67 may be of the type disclosed in my earlier U.S. patent Schjolin 2,322,479, issued June 22, 1943.

Since the reaction brake 26 in the FIGURE 1 and 2 embodiments is spring engaged, a reaction brake control valve 70 is provided which will be normally open, although illustrated closed, to insure that simultaneous with the supply of pressure fluid by the outlet conduit 68 to the conduit 36 for engaging the direct drive clutch 27, pressure fluid is also furnished through an upper branch passage 71 to the brake supply conduit 44 for disengaging the brake 26. Consequently, the brake 26 and the clutch 27 cannot be engaged at the same time. This control valve 70, a conventional spool type, is biased from the position shown by a spring 72 to a lower position, the normally open position, in which a reduced diameter portion 73 permits communication between outlet conduit 68 and upper branch passage 71. In the upper or neutral position this communication is cut off, the purpose of which will be explained later. An exhaust passage 74 is provided for relieving the area around the spring 72 of leakage fluid.

On the opposite side of the diagram from control valve 67 is a lockup clutch valve 76, which when opened by its solenoid, supplies pressure fluid from line 63 to the cylinder 12 for moving the turbine 11 axially to engage lockup clutch 16. If the solenoid is de-energized, the flow from conduit 63 is cut off and the lockup clutch supply passage 14 drains to the exhaust passage 77. The operation and structure of this lockup clutch valve 76 is identical with that of the direct drive clutch solenoid valve 66.

To obtain a neutral or a no drive condition of the transmission essential for shifting gears, a neutral control valve 78 is provided that is operated by a suitably mounted pedal 79 biased from the position shown by a suitable spring 81. This valve 78 includes a reduced diameter portion 82 and an extension 83 opposite the end of the valve connected to the pedal 79. In the position illustrated, the reduced diameter portion 82 permits passage of pressure fluid from the passage 63 to passage 51 for engaging the synchronizing brake 46. A branch passage 84, connected to the passage 51, conducts pressure fluid to an end area of the control valve 70 moving it upward to the position depicted. In this position communication between outlet conduit 68 and upper branch passage 71 is cut off while a lower branch passage 86 is opened to permit supply of pressure fluid to the passage 44 for disengaging the spring engaged reaction brake 26. When the neutral control valve 78 is moved to the right, pressure fluid in the passages 84 and 51 is relieved through an exhaust passage 87 connected to the sump 62. Simultaneous with the opening of the exhaust passage 87, the passage 63 will be cut off.

For energizing the solenoids of the valves 67 and 76 two electric circuits having a common source of electricity, e.g., a battery 88, are provided. The circuit for the direct drive clutch valve 67 includes an upper conductor 89 interconnecting the solenoid for the valve 67 and the battery 88, in which conductor there is disposed a manually operated main control switch 91. To complete this direct drive clutch circuit, a lower conductor 92 is afforded which connects the battery 88 and the solenoid for the control valve 67 and which includes a normally closed neutral switch 93 that can be opened by the extension 83 on the neutral control valve 78. For operating the valve 76, a branch conductor 94 including a lockup clutch switch 96 is arranged for conducting current from the battery 88.

Figure 4:
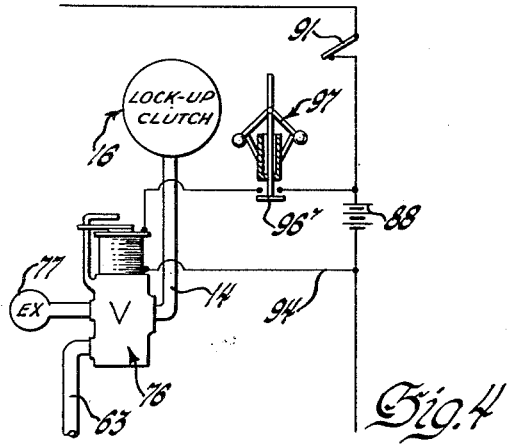
FIGURE 4 is a partial control diagram of a control system for the transmission employing a governor.

The lockup clutch switch 96 depicted in the FIGURE 3 diagram is manually operated to permit the vehicle operator to engage the lockup clutch 16 at will. In the modified FIGURE 4 diagram, a speed responsive means such as a conventional fly-weight centrifugal governor 97 operates a lockup clutch switch 96′ to render the control of the lockup clutch 16 responsive to either the speed of the engine or of the vehicle as desired. Preferably, in the FIGURE 1 and 2 embodiments, this governor 97 should be responsive to the speed of the vehicle so as to engage the lockup clutch 16 after some predetermined optimum vehicle speed is attained thus obtaining the best operating efficiency without coupling slip losses.

Operation

The operation of the FIGURE 1 and FIGURE 2 modifications in providing two speed ratios is essentially the same. In the FIGURE 1 transmission when the reaction brake is engaged by the spring 43, an overdrive speed ratio results; however, an underdrive speed ratio could be obtained simply by interchanging the gearing connections in a manner well known. If an underdrive ratio were available, initial operation of the transmission then would be in this ratio. In the transmissions illustrated drive is initiated with the direct drive clutch engaged and the reaction brake disengaged. To accomplish this the main control switch 91 is closed energizing the solenoid for the direct drive clutch valve 67. Assuming the pump 61 is engine driven, pressure fluid then will be supplied through the open valve 67 through the conduit 36 to engage the direct drive clutch 27. At the same time, since the reaction brake control valve 70 will be in the down position (the pedal 79 is released draining the synchronizing brake supply passage 51 and closing the neutral switch 93), pressure fluid is supplied through the upper branch passage 71 to the conduit 44 for disengaging the reaction brake 26. This will provide a fluid drive at substantially a 1 to 1 drive ratio which will be subject to coupling slip as mentioned before. If the operator desires to eliminate this coupling slip, the lockup clutch switch 96 may be closed energizing the lockup clutch valve 76 permitting pressure fluid to be supplied through the passage 14 for moving the turbine 11 axially and engaging the lockup clutch 16. When an upshift to the overdrive speed ratio is desired, the main control switch 91 is opened de-energizing the valve 67 so as to cause valve to close conduit 63 and open outlet conduit 68 to the exhaust passage 69, hence releasing the direct drive clutch 27 and permitting the spring 43 to engage the reaction brake 26. The vehicle then will move forward in an overdrive ratio. During the change of speed ratios the lockup clutch 16 can be maintained engaged without affecting the operation of the controls or if preferred, disengaged.

As mentioned before, it may be desirable to use some speed responsive means as governor 97 for determining when the lockup clutch 16 should be engaged. If the governor 97 is adapted to be subject to vehicle speed, the switch 96' will close the circuit 94 at some predetermined speed. This speed, of course, will be determined by the uses of the transmission.

When it is desired to shift the transmission gears, the pedal 79 is depressed moving the neutral control valve 78 to the position depicted in FIGURE 3. As a result, pressure fluid will be supplied by passage 63 through passages 84 and 86 to the supply conduit 44 disengaging the spring engaged reaction brake 26. Also, the switch 93 will be opened de-energizing the solenoid valve 67 and causing the direct drive clutch 27 to disengage as soon as the conduit 36 is opened to the exhaust passage 69. Since the reaction brake 26 is disengaged, the gearing 3 is, therefore, incapable of transmitting any drive. Consequently, it is immaterial whether the lockup clutch 16 is engaged or disengaged. With the synchronizing brake 46 engaged, rotation of the driven shaft 4 will be sufficiently retarded to permit the shifting of gears in the conventional transmission to a new speed ratio position.

In the FIGURE 2 modification, the same controls are employed with the reaction brake 26' being substituted for the reaction brake 26 in the system. The overdrive speed ratio is obtained by engaging this brake 26', hence holding the sun gear 24' against rotation. The other available speed ratio is operative when the direct drive clutch 27 in engaged to lock together the sun gear 24' and the pump 9. The other operations of the FIGURE 2 unit are exactly the same as those in the FIGURE 1 unit and, therefore, further explanation is not necessary.

It is apparent from the foregoing that by mounting above planetary gearing a fluid coupling with an integral lockup clutch utilizing the existing pressures within the coupling to disengage the clutch and that by concentrically mounting the planetary gearing and the coupling, a minimum of axial space is required for installing the unit. This is desirable since the unit can replace the conventional friction clutch between an engine and transmission with a minimum of changes. Furthermore, the two-speed unit is readily adapted for automatic and/or manual control depending on the desires of the operator and the work the unit must accomplish.

I claim:

1. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft and a reaction element adapted to establish drive through the planetary gearing; a second pressure actuated friction device adapted to afford a direct connection between the pump of said hydrodynamic drive device and one of the elements of said gearing so as to provide one speed ratio through the gearing; a third pressure actuated friction device for holding said reaction element to provide drive through the gearing at a different speed ratio; a brake for retarding rotation of the driven shaft; a control system including a source of fluid under pressure for operating said pressure actuated friction devices; and control means for engaging said brake while disengaging said friction devices.

2. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft, and a reaction element adapted to establish drive through the planetary gearing; a second pressure actuated friction device adapted to connect the pump of said hydrodynamic drive device to an element of said gearing to provide drive at one speed ratio through the gearing; a third pressure actuated friction device for holding the reaction element to provide drive through the gearing at a different speed ratio; one of said friction devices being normally engaged and being adapted for disengagement by fluid pressure; a control system including a source of fluid under pressure for operating said pressure actuated friction devices; a brake for retarding rotation of the driven shaft; fluid pressure means for actuating the brake; and means for supplying fluid pressure to actuate said brake while supplying fluid pressure to disengage said normally engaged friction device.

3. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft and a reaction element adapted to establish drive through the planetary gearing; a second pressure actuated friction device adapted to afford a direct connection between the pump of said hydrodynamic drive device and one of the elements of said gearing so as to provide one speed ratio through the gearing; a third pressure actuated friction device for holding said reaction element to provide drive through the gearing at a different speed ratio; a brake for retarding rotation of the driven shaft; a control system including a source of fluid under pressure for operating said pressure actuated friction devices; and means for supplying fluid pressure to actuate said brake while relieving said friction devices of pressure actuation.

4. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft, and a reaction element adapted to establish drive through the planetary gearing; a second pressure actuated friction device adapted to connect the pump of said hydrodynamic drive device to an element of said gearing to provide drive at one speed ratio through the gearing; a third pressure actuated friction device for holding the reaction element to provide drive through the gearing at a different speed ratio; a control system including a source of fluid under pressure for operating said pressure actuated friction devices; one of said friction devices being normally engaged and being adapted for disengagement by fluid pressure; a brake for retarding rotation of the driven shaft; fluid pressure means for actuating said brake; and means for supplying fluid pressure to actuate said brake while supplying fluid pressure both to disengage said normally engaged friction device and causing relief of said other friction devices of pressure actuation.

5. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft, and a reaction element adapted to establish drive through the planetary gearing; a second pressure actuated friction device adapted to afford a direct connection between the pump of said hydrodynamic drive device and one of the elements of said gearing so as to provide one speed ratio through the gearing; a third pressure actuated friction device for holding said reaction element to provide drive through the gearing at a different speed ratio; a brake for retarding rotation of the driven shaft; a control system including a source of fluid under pressure for operating said pressure actuated friction devices; and valve control means for engaging said brake while disengaging said friction devices.

6. In a transmission having a drive shaft and a driven shaft; a hydrodynamic drive device including a pump connected to said drive shaft and a turbine; a first pressure actuated friction device for connecting said pump and said turbine; planetary gearing including an input element driven by said turbine, an output element connected to the driven shaft, and a reaction element adapted to establish drive through the planetary gearing; a second pressure actuated friction device adapted to afford a direct connection between the pump of said hydrodynamic drive device and one of the elements of said gearing so as to provide one speed ratio through the gearing; a third pressure actuated friction device for holding said reaction element to provide drive through the gearing at a different speed ratio; a pressure actuated brake for retarding rotation of the driven shaft; a control system including a source of fluid under pressure for operating said pressure actuated friction devices; and a manually operated control valve for supplying pressure fluid from said source for actuating said brake while causing said second and third friction devices to be disengaged.

7. In a transmission having a drive shaft and a driven shaft; a hydrodynamic drive device including a pump connected to said drive shaft and a turbine; a first friction device for connecting said pump and said turbine so as to lock up said hydrodynamic device and provide a two-way drive therebetween; means responsive to the speed of one of said shafts for engaging said first friction device; planetary gearing including an input element driven by said turbine, an output element connected to said driven shaft, and a reaction element adapted to establish drive through the planetary gearing; a second friction device adapted to afford a direct connection between the pump of said hydrodynamic drive device and one of the elements of said gearing so as to provide a drive at one speed ratio through the gearing; a third friction device adapted to hold said reaction element to provide drive through the gearing at a different speed ratio; a brake for retarding rotation of said driven shaft; and control means for engaging the brake while disengaging the friction devices.

8. In a transmission having a drive shaft and a driven shaft; a hydrodynamic drive device including a pump connected to said drive shaft and a turbine; a first pressure actuated friction device for connecting said pump and turbine; means responsive to the speed of one of said shafts for engaging said first friction device; planetary gearing including an input element driven by said turbine, an output element connected to the driven shaft, and a reaction element adapted to establish drive through the planetary gearing; a second pressure actuated friction device adapted to connect the pump of said hydrodynamic drive device to an element of said gearing to provide drive at one speed ratio through the gearing; a third pressure actuated friction device for holding the reaction element to provide drive through the gearing at a different speed ratio; one of said friction devices being normally engaged and being adapted for disengagement by fluid pressure; a control system including a source of fluid under pressure for operating said pressure actuated friction devices; a brake for retarding rotation of the driven shaft; fluid pressure means for actuating said brake; and means for supplying fluid pressure to actuate said brake while supplying fluid pressure to disengage said normally engaged friction device and causing relief of said other friction devices of fluid pressure.

9. In a transmission having a drive shaft and a driven shaft; a hydrodynamic drive device including a pump connected to said drive shaft and an axially movable turbine; first clutch means for clutching together said pump and turbine comprising coacting clutch surfaces on said pump and turbine; means for moving said turbine axially to engage said clutch surfaces; planetary gearing including an input element driven by said turbine, an output element connected to the driven shaft, and a reaction element adapted to establish drive through the planetary gearing; second clutch means for connecting the pump of said hydrodynamic drive device to one of the elements of said gearing to provide one speed ratio through the gearing; first brake means for holding said reaction element to provide drive through the gearing at a different speed ratio; second brake means operative to retard rotation of said driven shaft; and control means for rendering said second brake means operative and said transmission incapable of transmitting torque between the drive and driven shafts.

10. In a transmission having a drive shaft and a driven shaft; a hydrodynamic drive device including a pump connected to the drive shaft, and a turbine; first clutch means for clutching together said pump and turbine; means responsive to the speed of one of said shatfs for causing engagement of said first clutch means; planetary gearing comprising an input element driven by said turbine, an output element connected to the driven shaft and a reaction element adapted to establish drive through the planetary gearing; second clutch means for connecting the pump of said hydrodynamic drive device to one of the elements of said gearing to provide one speed ratio through the gearing; first brake means for holding said reaction element to provide drive through the gearing at a different speed ratio; second brake means operative to retard rotation of said driven shaft; and control means for rendering said second brake means operative and both said second clutch and said first brake means inoperative so that said planetary gearing is incapable of transmitting torque between said turbine and said driven shaft.

11. In a transmission having a drive shaft and a driven shaft; a hydrodynamic drive device including a pump connected to the drive shaft, and an axially movable turbine; first clutch means for clutching together said pump and turbine comprising coacting clutch surfaces on said pump and turbine; means responsive to the speed of one of said shafts and adapted to cause said turbine to move axially for engaging said clutch surfaces; planetary gearing adapted to interconnect said hydrodynamic drive device and said driven shaft; second clutch means coacting with said gearing to provide a substantially direct drive ratio therethrough; first brake means associated with said gearing to render said gearing operative to provide another drive ratio; second brake means operative to retard rotation of said driven shaft; and control means for rendering said second brake means operative and both said second clutch means and said first brake means inoperative so that said planetary gearing is incapable of transmitting torque between said hydrodynamic drive device and said driven shaft.

12. In a transmission having a drive shaft and a driven shaft; a hydrodynamic drive device including a pump and an axially movable turbine; a housing connecting said pump to said drive shaft and substantially enclosing said turbine; said turbine including a piston portion adapted for movement relative to said housing; first clutch means for clutching together said pump and turbine comprising coacting clutch surfaces on said pump and turbine; means acting on said piston portion for selectively moving said turbine axially for engaging said clutch surfaces; said first clutch means being disengageable by pressure within said hydrodynamic drive device, planetary gearing comprising an input element driven by said turbine, an output element connected to the driven shaft, and a reaction element adapted to establish drive through the planetary gearing; second clutch means adapted to connect the pump of said hydrodynamic drive device to one of the elements of said gearing to provide one speed ratio through the gearing; first brake means for holding said reaction element to provide drive through the gearing at a different speed ratio; second brake means for retarding rotation of said driven shaft; and control means for rendering said second brake means operative and both said second clutch means and said first brake means inoperative so that said planetary gearing is incapable of transmitting torque between said hydrodynamic drive device and said driven shaft.

13. In a transmission having a drive shaft and a driven shaft; a hydrodynamic drive device including a pump connected to said drive shaft and a turbine; a first friction device for connecting said pump and said turbine for locking up the hydrodynamic drive device so as to afford a two-way drive therebetween; planetary gearing including an input element driven by said turbine; an output element connected to said driven shaft, and a reaction element adapted to establish drive through the planetary gearing; a second friction device adapted to connect the pump of said hydrodynamic drive device to one of the elements of said gearing to provide a drive at one speed ratio through the gearing; a third friction device adapted to hold said reaction element to provide drive through the gearing at a different speed ratio; a brake for retarding rotation of said driven shaft; and control means operative both to engage the brake and disengage the second and third friction devices so as to render the planetary gearing ineffective to transfer drive from the hydrodynamic drive device to the driven shaft.

14. In a transmission having a drive shaft and a driven shaft, a hydrodynamic drive device including a pump connected to said drive shaft and a turbine, first clutch means for clutching together said pump and turbine comprising mating conical surfaces on said pump and turbine engageable so as to afford a two-way drive therebetween, planetary gearing adapted to interconnect said turbine and said driven shaft, second clutch means coacting with said gearing to provide one forward drive ratio therethrough, and brake means associated with said gearing to render said gearing operative to provide another forward drive ratio.

15. In a transmission having a drive shaft and a driven shaft, a hydrodynamic drive device including a pump connected to said drive shaft and a turbine, first clutch means for clutching together said pump and turbine so as to afford a two-way drive therebetween, planetary gearing adapted to interconnect said turbine and said driven shaft, second clutch means coacting with said gearing to provide one forward drive ratio, first brake means associated with said gearing to render said gearing operative to provide another forward drive ratio, and second brake means for simultaneously and gradually retarding rotation of said driven shaft and rendering said second clutch means and said first brake means inoperative so that said planetary gearing is incapable of transmitting torque between said turbine and said driven shaft.

References Cited in the file of this patent

UNITED STATES PATENTS

| | | |
|---|---|---|
| 2,130,895 | Ness | Sept. 20, 1938 |
| 2,298,648 | Russell | Oct. 13, 1942 |
| 2,312,849 | Pollard | Mar. 2, 1943 |
| 2,595,969 | McFarland | May 6, 1952 |
| 2,731,119 | Burdett et al. | Jan. 17, 1956 |
| 2,737,824 | Livermore | Mar. 13, 1956 |
| 2,815,684 | Roche | Dec. 10, 1957 |